(12) United States Patent
Howard

(10) Patent No.: US 7,102,842 B1
(45) Date of Patent: Sep. 5, 2006

(54) DISK DATA STORAGE APPARATUS AND METHOD USING MULTIPLE HEAD ACTUATORS

(76) Inventor: Albert R. Howard, 1010 Rockrose Ave., Sunnyvale, CA (US) 94086

(*) Notice: Subject to any disclaimer, the term of this patent is extended or adjusted under 35 U.S.C. 154(b) by 45 days.

(21) Appl. No.: 10/863,140

(22) Filed: Jun. 8, 2004

(51) Int. Cl.
*G11B 21/02* (2006.01)
*G11B 15/21* (2006.01)

(52) U.S. Cl. .................. 360/61; 360/78.12
(58) Field of Classification Search .............. None
See application file for complete search history.

(56) References Cited

U.S. PATENT DOCUMENTS

| | | | | |
|---|---|---|---|---|
| 5,375,020 A | * | 12/1994 | Aggarwal et al. | 360/75 |
| 6,061,194 A | * | 5/2000 | Bailey | 360/47 |
| 6,437,937 B1 | * | 8/2002 | Guo et al. | 360/78.05 |

* cited by examiner

*Primary Examiner*—Andrea Wellington
*Assistant Examiner*—Varsha A. Kapadia
(74) *Attorney, Agent, or Firm*—Jay A. Chesavage

(57) ABSTRACT

A multi-head actuator data storage device reads and writes data simultaneously to one of a plurality m of heads, the plurality of m heads mounted on each of n head actuators where the plurality of n head actuators are separated from each other by an angular separation distance of 360/n degrees. The data on the disk is organized into a plurality of logical sectors, each logical sector comprising n ordered physical sectors, where the plurality n of ordered physical sectors is separated by the same angular distance separating the head actuators. During a write operation, each head actuator independently seeks to a unique physical sector, and the order of the physical sectors is communicated to a data de-multiplexer which writes de-multiplexed data to the physical sectors in a predetermined order. During a read operation, each head actuator independently seeks to a unique physical sector selected for minimum access time, and the order of the physical sectors is communicated to the data multiplexer such that the predetermined order is preserved during the multiplexing of the data arriving from the n head actuators simultaneously.

50 Claims, 8 Drawing Sheets

Redundant r/w or 2 independent interfaces

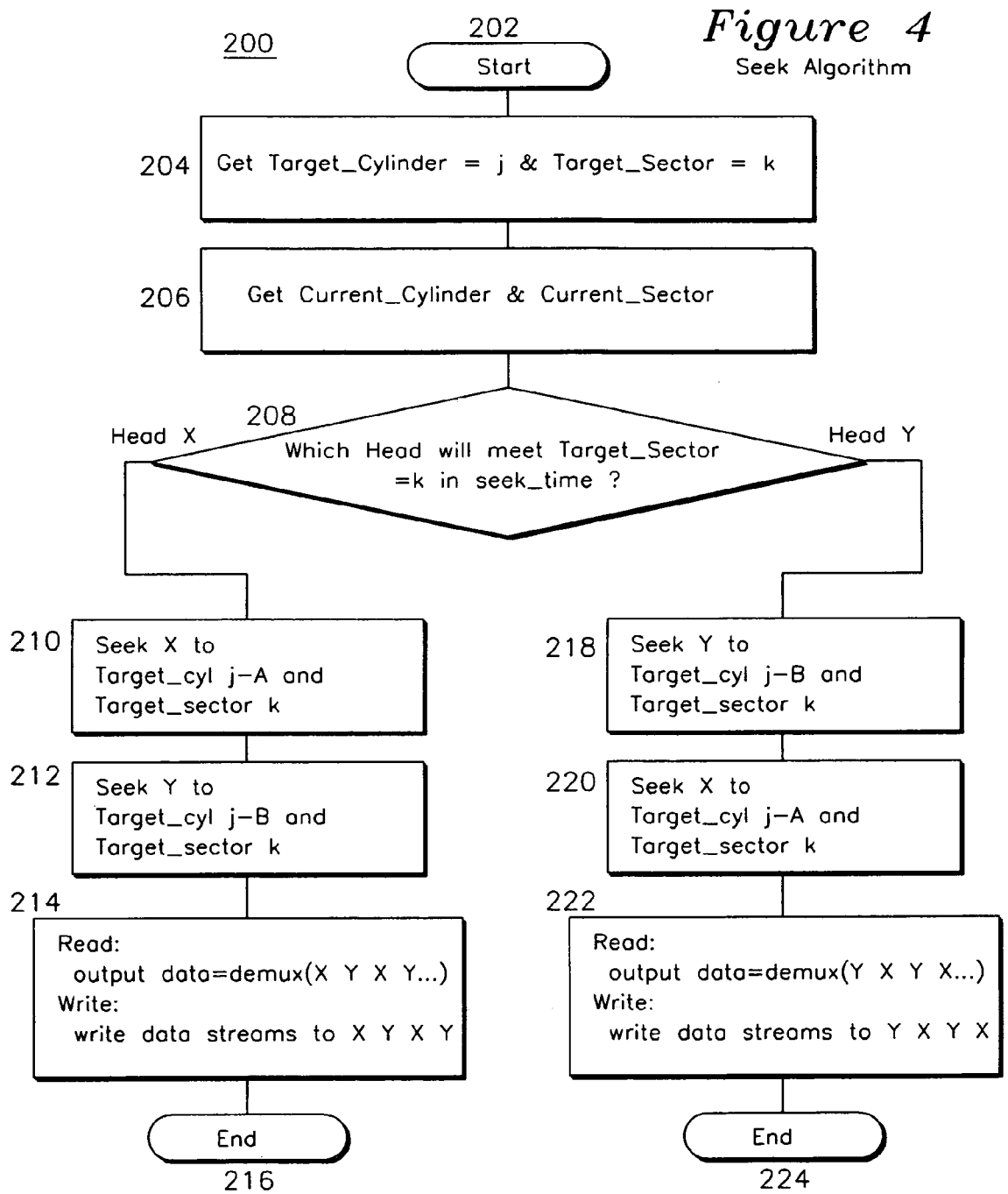

Channel X closest to First Physical Sector

Write Operation

Write De-multiplexer (X next sector)

Write De-multiplexer (Y next sector)

Figure 6d
Read Operation
First Phys Sec Cyl j-A: | aa | cc | ee | gg | ii | kk |
Sec Phys Sec Cyl j-B: | bb | dd | ff | hh | jj | ll |
Data read after multiplexing
| aa | bb | cc | dd | ee | ff | gg | hh | ii | jj | kk | ll |
Figure 6e
Read multiplexer
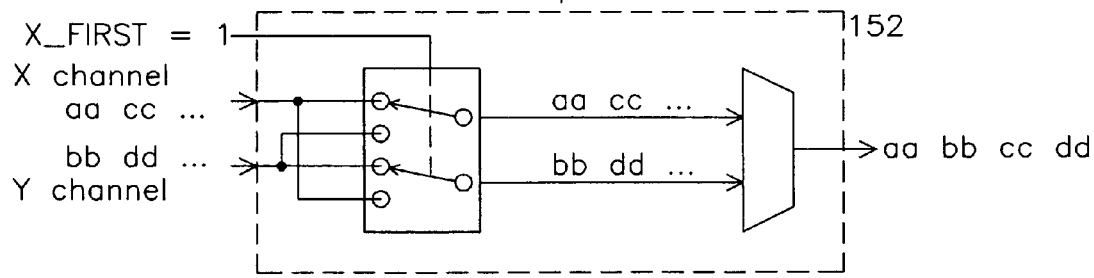
Figure 6f
Read multiplexer
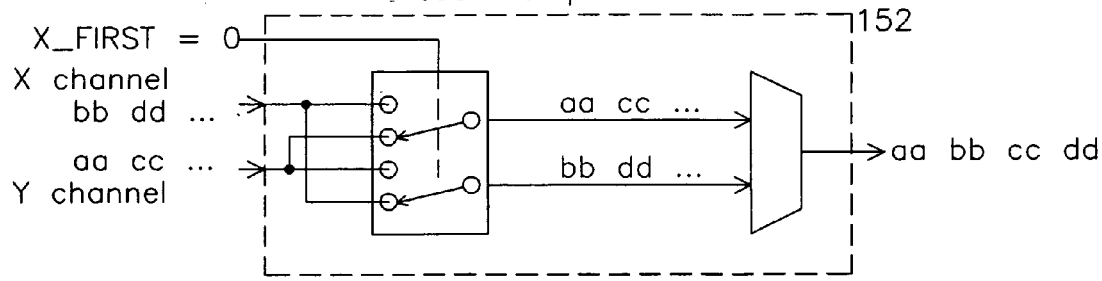

DISK DATA STORAGE APPARATUS AND METHOD USING MULTIPLE HEAD ACTUATORS

FIELD OF THE INVENTION

The present invention is related to data storage devices, particularly disk drives. More particularly, the invention describes an apparatus and method for storing information on a disk data storage device whereby heads on multiple individual actuators may be simultaneously written or read.

BACKGROUND OF THE INVENTION

Prior art data storage systems using rotating media divide the storage media into a concentric series of magnetic tracks known as cylinders, and a radial division of those cylinders, which are known as sectors. Each track includes separately written positional information so that reading the disk provides information on the current cylinder and sector. The time for a read-write (r/w) head controlled by an actuator to be moved over a rotating disk from a current position to a target position cylinder and sector is known as seek time. The seek time is a measurement of the latency time between when a given cylinder and sector is requested and the read/write head is located over the data of that location such that the data may be read or written. The latency or seek time to get to a random sector is on average half of the rotational time of the disk, and has a maximum value of the time for a full rotation of the disk. The radial seek time to get to a particular cylinder is governed by a servo mechanism which moves the head or plurality of heads on an actuator across the cylinders in a generally radial direction. In a typical disk drive, the rotational speed of the disk may be in the neighborhood of 7200 rpm, or 8.3 ms per rotation, while the track to track seek time is typically less than 1 ms. This causes the maximum seek time to be dominated by the rotational speed of the drive by a factor of 8 or more. While increases in rotational speed continue to occur and reduce this value, it is desired to reduce the rotational seek latency for any rotational speed.

While multiple heads on a single actuator have been used to increase storage capacity, another use for multiple head actuators is to provide independent movement of one set of heads from another, and to provide movement of independent multiple heads over the same media surface. This may be done to increase data throughput, or it may be done to provide multiple independent interfaces to the same media.

U.S. Pat. No. 4,270,154 "Head Selection Technique" by Crawford discloses the use of multiple head stacks (actuators) to improve access time and proposes multiple head positioning algorithms, but uses only one head at a time for reading or writing data.

U.S. Pat. Nos. 5,223,993 and 5,293,282 "Multiple Actuator Disk Drive" by Squires et al teach mechanical details for constructing a disk drive with multiple voice coil motor actuators and embedded servos for moving the multiple heads, while U.S. Pat. No. 5,261,058 "Multiple Microcontroller Hard Disk Drive Control Architecture", by Squires et al discusses the use of microcontrollers for controlling a single head disk drive. However these patents do not teach or take advantage of the additional actuators to improve data throughput.

U.S. Pat. No. 5,355,486 by Cornaby describes a controller for a multiple head actuator disk drive. The controller specifically teaches a method for enabling either multiple interfaces on a single controller, or redundant writing of data from a controller interface, but does not describe a method for reducing seek latency on read or write operations.

U.S. Pat. No. 5,901,010 by Glover et al describes a two stage actuator for a ganged head system whereby a single actuator causes a primary head to track a particular cylinder of magnetic data, while a secondary head common to the primary head actuator tracks magnetic information from a cylinder on the opposite side of the primary head. This system also teaches demultiplexing and multiplexing data between two heads attached to the same actuator but does not teach demultiplexing to multiple heads on multiple actuators being positioned over the same cylinder and sector to improve seek latency.

U.S. Pat. No. 6,061,194 "Device and Method for Storing and Retrieving Original and Redundant Data" describes the reduction of seek latency by the positioning of multiple heads over the disk media, as well as recording multiple copies of data by each head. This system reduces latency at the expense of reduced recording density, since information is redundantly recorded. In addition, data write time is doubled as only a single head is used during a data write cycle.

6,121,742 by Misso describes a multiple head actuator control system for a disk drive. The system provides for variably allocating servo system bandwidth, anticipating that the head actuators are engaged in different tasks i.e. when one head is seeking and the other is idle.

U.S. Pat. No. 6,563,657 "Multiple and Reconfigurable Data Access and Storage Device using Multiple Actuators" by Serrano et al describes improved data throughput using multiple co-axial actuators as described in U.S. Pat. No. 6,121,742 described above. U.S. Pat. No. 6,563,657 uses the coaxial head actuators and a controller to reduce seek time as a single physical device, or as two independent physical devices but does not teach improved latency performance as the multiple actuators are located on the same axis.

U.S. Pat. No. 6,728,054 by Chng et al "Drive with Adaptive Data Format and Head Switch Sequencing" describes an addressing system for a disk drive for translating addresses at an interface into physical cylinder, head and sectors of the drive.

A publication by Sorin G. Stan, "Twin Actuators for Ultra-Fast Access in CD-ROM Systems" IEEE Transactions on Consumer Electronics, vol 42, No. 4, pp. 1073–1084, Nov. 1996, describes the advantages of various seek algorithms in a CD ROM system where two heads are joined by a common single actuator where the two heads move in tandem together either on the same side of the center spindle, or on opposing sides.

FIG. 1 shows a prior art disk drive and controller 100 for a two actuator system having an X channel including read/write head 118a on a movable actuator 117a and a Y channel including r/w head 118b on a movable actuator 117b. Data storage media 102 is in the form of a rotating disk having a surface which can be recorded and later read, and is driven by a spindle motor 104 under the control of a host interface controller 108. Host interface controller 108 receives read and write commands from a host interface bus 106, and each read or write command is optionally accompanied by the address of a cylinder and sector to be read or written, as will be described later. Examining the operation of the X channel, an access to a particular cylinder involves radially moving a read/write head 118a which may be located opposite a pivot point 101a on an actuator 117a, which is done by an actuator motor 116a under the control of a head servo controller 114a, which reads head positional information from the head 118a, and seeks to the desired cylinder location. When the correct sector rotates into position on a read operation, data is read serially from the r/w head 118a into the r/w amplifier controller 112a, and the data is sent to an error correction code (ECC) and memory manager 110a, which detects and corrects errors and buffers data. The error-corrected data is then presented to host interface 108 for transmission across the host interface bus 106. For a write operation, the seek operation is identical as before, and the data to be written which accompanied the seek request is transferred through the host interface bus 106 to the host interface controller 108, to the ECC 110a for generation of error correction information and buffering, and to the head r/w amplifier 112a, which may also serially encode the data to be written to the r/w head 118a on the correct cylinder and sector. In the prior art disk controller 108 which includes an independently controllable set of r/w heads 118b on a second Y channel, the identical functions are performed as were found on the X channel. Where a functional element of the X channel carried an "a" suffix on the reference numerals, the Y channel element performing the identical function carries a "b" suffix, such as actuator motor 116b, head servo controller 114b, head r/w amplifier and controller 112b, and ECC and memory manager 110b. The host interface controller 108 may control the X channel and Y channel independently as described in the prior art below, or it may control the two together to achieve a reduced seek time, as described in the prior art above.

It is desired for a disk drive having a plurality n of independently controllable head actuators which are located substantially 360/n degrees apart to operate collectively to form a single operational unit which enables n times the data throughput of a single head actuator disk system for read and write operations, and for the disk controller to provide $T_{seek}/n$ seek time, where $T_{seek}$ is the random seek time for a single head actuator equivalent disk controller performing the same function.

The prior art controllers describe systems which provide for increased throughput or reduced latency, but do not provide an apparatus or method for providing both.

OBJECTS OF THE INVENTION

A first object of the invention is a disk drive system having n r/w head actuators located substantially 360/n degrees apart from each other about a spindle center, where the n head actuators read or write data which is provided on a logical sector comprising n physical sectors.

A second object of the invention is a method for storing information on a disk media using a plurality of logical sectors for use by n head actuators, where each logical sector comprises n ordered physical sectors of data which are located 360/n degrees apart about a spindle center.

A third object of the invention is a method for retrieving information on a disk media using a plurality of logical sectors for use by n head actuators, where each logical sector comprises n ordered physical sectors of data which are located 360/n degrees apart about a spindle center.

SUMMARY OF THE INVENTION

A plurality n of disk drive head actuators are located substantially 360/n degrees of arc separation about a spindle center. Each of the n disk drive head actuators is independently controllable and movable over the surface of the disk, and may operate on a plurality of disks stacked on a common spindle. The spindle center locates the center of a rotating disk containing information to be read or written. The information on the disk is organized on concentric tracks known as cylinders which are divided into sectors, as known in the prior art. In the present invention, the total disk storage is subdivided into a plurality of logical sectors, where each logical sector comprises an ordered set of n physical sectors, each physical sector representing a data track on the disk which may also include cylinder and sector location information used during seek time. The n physical sectors forming a logical sector are located with the same angular spacing as the head actuators so that each of the n physical sectors comprising a logical sector may be read or written simultaneously by the n head actuators. An ordering is assigned to each of the n physical sectors so that each logical sector comprises a first physical sector, a second physical sector, and so on until the nth physical sector is reached. For n adjacent tracks, the ordering may be achieved by utilizing the outermost physical sector for the first physical sector, and the innermost physical sector for the nth physical sector, or any ordering which results in substantially the same amount of storage capacity on each physical sector, and where the physical sector order within a particular logical sector is discernable to the head actuators reading the physical sectors, such that this ordering can be resolved and used to preserve the order of written or read data. Data is multiplexed and de-multiplexed according to the ordering such that the physical sector ordering of data is preserved during read or write operations, respectively. Upon receipt of a read or write request, a determination is made by the controller of which read/write head for an associated actuator is closest to the first physical sector, and all head actuators seek to their respective unique first through nth physical sectors. The head actuators seek to unique physical sectors, since a read/write head on each of the n head actuators is uniquely reading one of the n physical sectors. Data from all physical sectors is read at substantially the same time, and multiplexed together according to the physical sector ordering used to write the data, thereby forming a single stream of output data. In this manner, the rotational latency is reduced to 1/nth of the rotational latency of a single head actuator. In addition, since all of the data is read simultaneously, the throughput of the disk drive is n times the throughput of a single head actuator disk drive, and both performance metrics of reduced latency and higher throughput are simultaneously realized. For a write operation, the sequence is identical to the read sequence, whereby the seek operation results in the closest read/write head associated with an actuator moving to the target sector to become the first physical sector, accompanied simultaneously by the read/write heads of the remaining actuators, and the ordering of data to be written follows the physical sector order such that order of data that is later read from the write operation is resolvable by physical sector order.

BRIEF DESCRIPTION OF THE DRAWINGS

FIG. 4 shows the process flow diagram for reading or writing data to the storage device of FIG. 2.

FIG. 6c shows the de-multiplexing of write data for the sequence of FIG. 5a.

FIGS. 6d and 6e show the multiplexing of read data for the sequence of FIG. 5c.

FIG. 6f shows the multiplexing of read data for the sequence of FIG. 5a.

DETAILED DESCRIPTION OF THE INVENTION

Figure 1:
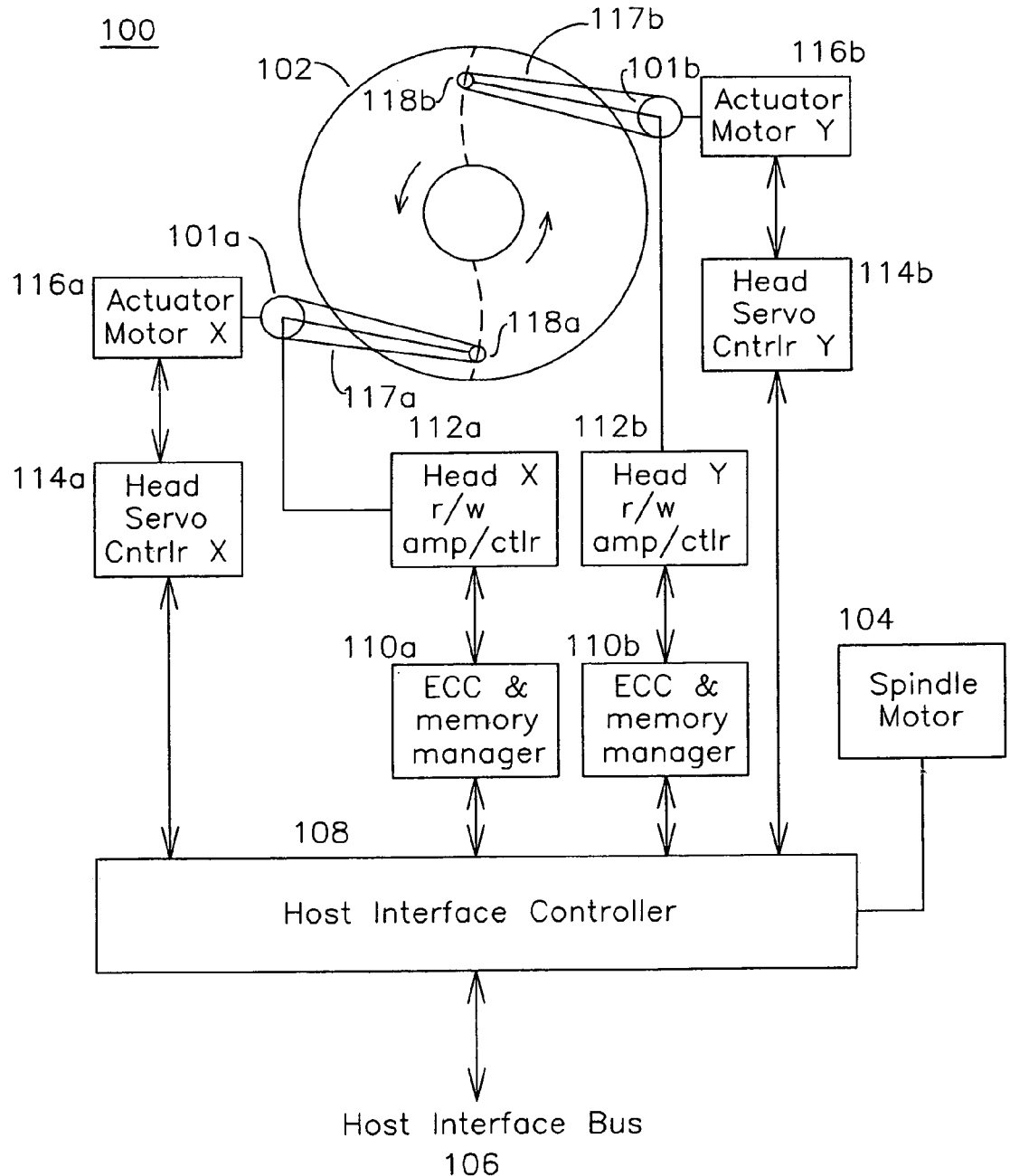
FIG. 1 shows the block diagram of a prior art multi-head actuator disk drive and controller.
Figure 2:
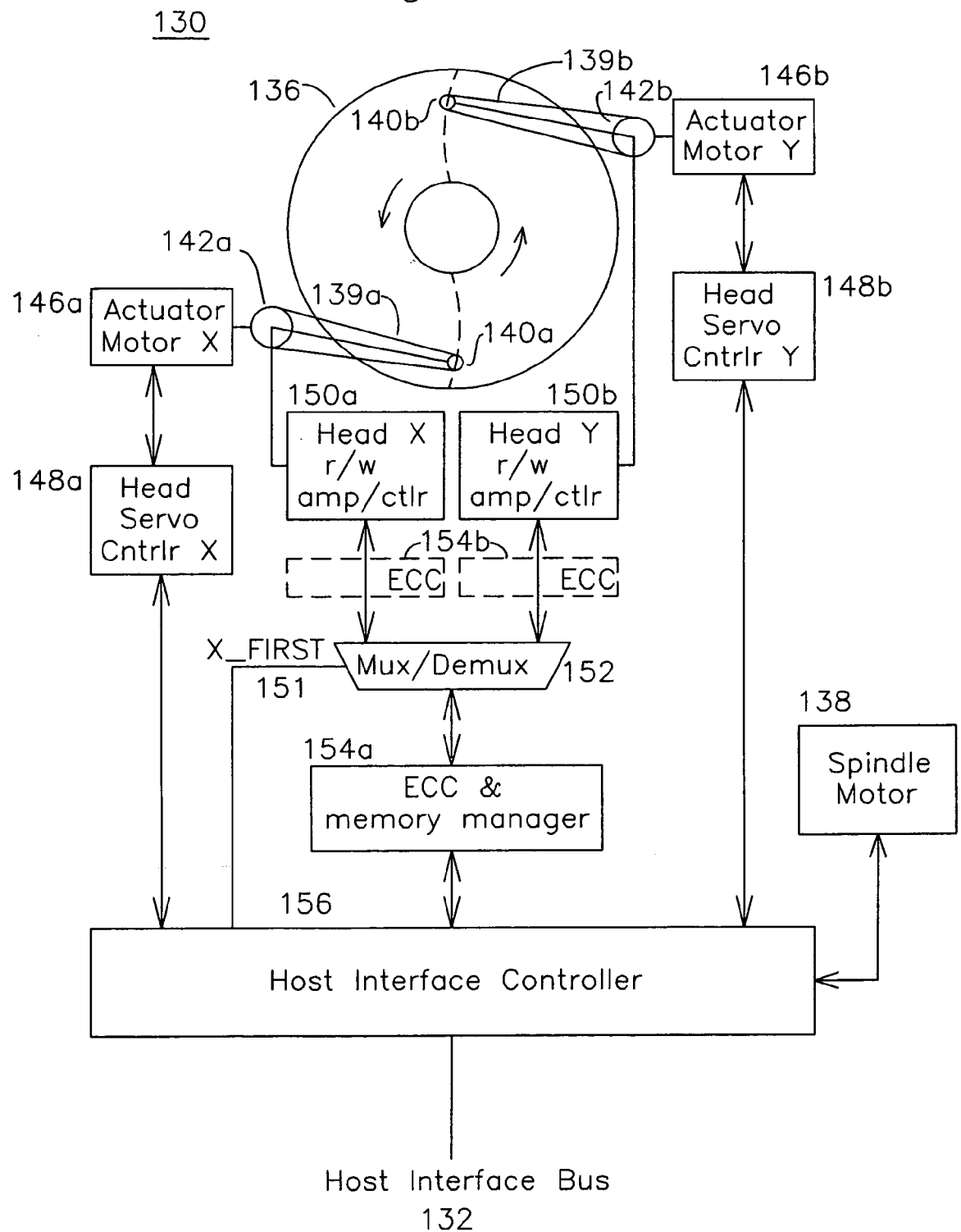
FIG. 2 shows a block diagram for the present invention.

FIG. 2 shows a disk drive system 130 which includes an X channel and a Y channel for independently controllable and movable read/write heads 140a and 140b mounted on head actuators 139a and 139b which seek to cylinders and sectors (not shown) on storage disk 136. In prior art systems, multiple heads referred to a plurality of heads on a single actuator. For clarity in this multiple actuator system, where each actuator may also have a plurality of heads, reference for an actuator 139a or 139b uses the term "head actuator", where the plurality of "head actuators" may each have a plurality of read/write heads 140a for head actuator 139a and plurality of read write heads 140b for head actuator 139b. In the present system, where multiple heads exist on a single actuator for operating with multiple disks and both surfaces on each disk, only one head on a particular actuator is selected at a time for a read or write operation.

Examining one of the channels, the X channel comprises radially moving head actuator 139a which may include a plurality of read/write heads 140a whereby the read/write heads 140a couple signals to and from head X r/w amplifier/controller 150a, including reading positional information written on disk 136 which is returned to head servo controller X 148a and actuator motor 146a, which controls the radial position of read/write head 140a over the disk surface. The Y channel similarly comprises radially seeking head actuator 139b and associated read/write head 140b which provides a signal to head Y r/w amplifier/controller 150b, including positional information written on disk 136, which is returned to head servo controller Y 148b and actuator motor 146b, which similarly controls the radial position of head actuator 139b over the disk surface. In this manner, the two head actuators 139a and 139b are independently controllable and movable over the surface of the media 136. Data read from the X and Y r/w amplifier/controllers 150a and 150b are multiplexed together in mux 152, which utilizes an order signal X_FIRST 151 to preserve the ordering of data from each read/write head to match the ordering of the physical sectors, as will be described later, and after the ordering of the physical sectors, is optionally delivered to the ECC and buffered by the memory manager 154a for delivery to host interface controller 156, accessible to the requesting device via host interface bus 132, which may be any interface bus known to disk drive controllers, such as ATA, serial ATA, IDE, SCSI, etc. The media 136 is rotated by spindle motor 138, which is controlled by host interface controller 156 and is tracking the angular position of the spindle motor. Data to be written to media 136 is delivered to the ECC and memory manager 154a which adds additional bits of error correction before passing the error correction encoded data to de-multiplexer 152, which provides ordering of the data streams to r/w amplifiers/controllers 150a and 150b and to r/w heads 140a and 140b. The r/w head actuators 139a and 139b seek to the desired logical sector, which comprises ordered physical sectors where the number of physical sectors n equals the number of head actuators in the system, and the head actuators seek to positions which match the earliest arrival of the physical sectors, as will be described later.

Figure 3:
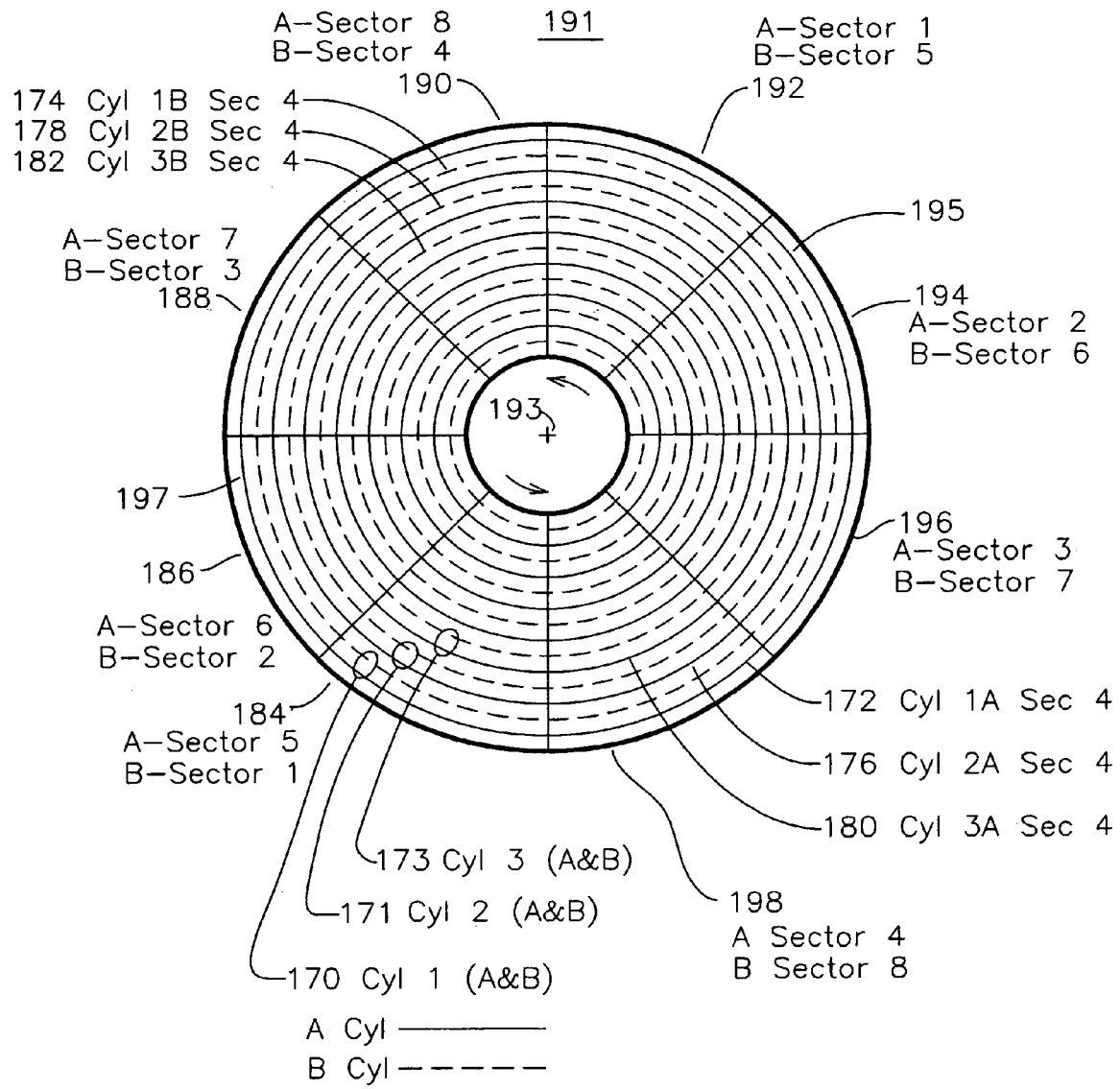
FIG. 3 shows an arrangement of logical sectors and first and second physical sectors for 8 sectors and number of head actuators n=2.

FIG. 3 shows a simplified layout of ordered physical sectors for the case where there are 8 sectors and n=2 head actuators. The media 191 in the simplified view of FIG. 3 comprises a plurality of concentric cylinders such as cylinder 170A and 170B, which are further divided azimuthally into eight sectors 184, 186, 188, 190, 192, 194, 196, and 198. The number of sectors is preferentially equal to a multiple of the number of head actuators, and the circumferential spacing of each head actuator is preferentially substantially equal about the spindle center 193 such that the included angle between head actuators and also between physical sectors is also substantially equal and approximately 360/n degrees about the spindle center, or axis 193. The disk 191 therefore comprises a plurality of logical sectors, and each logical sector is formed from n physical sectors, where the n physical sectors are ordered in a manner resolvable by the controller. The ordering simply means that the placement of the n physical sectors which form the logical sector is done such that the physical sectors share the same angular spacing as the head actuators as described earlier, and further that the set of physical sectors is resolvable by the controller 156 of FIG. 2 into the same order for reading as was used for writing. The ordering of physical sectors for n=2 results in the ability to divide data to be written into an A part and a B part, write the divided data simultaneously to physical sectors A and B for the illustrated case, and therefore recover A and B from physical sectors A and B, and de-multiplex the A part and the B part together to recover the data that was originally written. For example, referring to FIG. 3, one of the many ways of creating logical sectors where n is an even number would be to designate each pair of cylinders A and B, as shown by cylinder 1 170. The odd A cylinders are shown by solid lines, and the even B cylinders are shown by dashed lines. The sector numbering for odd A cylinders starts 1 at sector 192, and continues through sector 2 194, sector 3 196, sector 4 198, sector 5 184, sector 6 186, sector 7 188, and sector 8 190. The sector numbering for even B cylinders starts at 1 360/n=180 degrees opposite, and continues in the same direction: B cylinder sector 1 184, sector 2 186, sector 3 188, sector 4 190, sector 5 192, sector 6 194, sector 7 196, and sector 8 198. One logical sector would comprise ordered physical sectors {172, 174}, and another logical sector would comprise ordered physical sectors {176, 178}, and another logical sector would comprise ordered physical sectors {180, 182}. In this manner, logical sectors comprise a plurality n of ordered physical sectors which are located about the circumference of the storage disk 191 with substantially the same spacing as the r/w head actuators.

Another way to create logical sectors comprising ordered physical sectors is to use sectors on the same cylinder spaced 360/n degrees apart. For example, a logical sector in this configuration could include first physical sector 195 and second physical sector 197, both located on the same cylinder, but spaced 180 degrees apart for n=2.

Figure 6A:
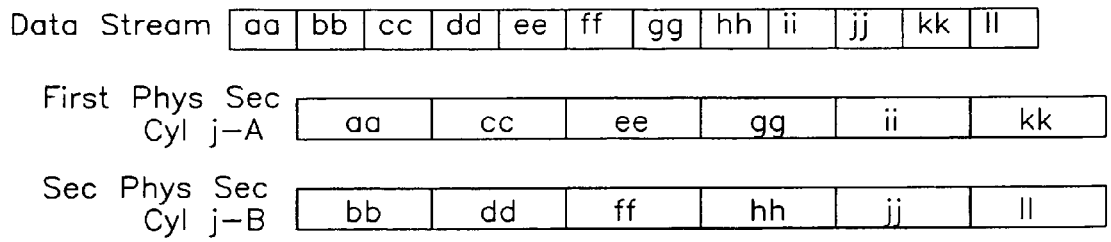
FIGS. 6a and 6b show the de-multiplexing of write data for the sequence of FIG. 5c.

FIG. 4 shows a flowchart 200 for the use of logical sectors comprising ordered physical sectors in the present invention. The process enters at step 202 and recovers the Target_Cylinder=j and Target_Sector=k in step 204. The controller 156 of FIG. 2 reads head servos 148a and 148b of FIG. 2 and determines the Current_Cylinder and Current_Sector for each head actuator in step 206, which is an estimate of position for each head actuator of the system. In step 208, a computation is performed to determine which head actuator will meet the Target_Cylinder and Target_Sector in the minimum time it takes to seek to the new position. The value of seek_time may be a constant set to the maximum time to seek from one cylinder to another, or in the preferred embodiment, the values of Current_Cylinder, Current_Sector, Target_Cylinder, and Target_Sector are used to determine a seek time specific to those particular values, which reflects that seek times across a small number of cylinders is shorter than seek times from innermost to outermost cylinders of the disk. Additionally, the Current_Sector information may be read from optical or other sensors located in the spindle motor 138 of FIG. 2. As was seen in FIG. 3, the plurality of physical sectors which form logical sectors may occur on different cylinders, and since there are multiple independent head actuators, it is desired to seek the next head actuator to a particular cylinder, and the next head actuator could be any of the n head actuators present. For the case of two head actuators with a logical sector comprising two ordered physical sectors, one of the head actuators X or Y will be closest to the first physical sector, and the other head actuator will be closest to the second physical sector. If head actuator X of FIG. 2 is closest to the first physical sector, then head actuator X seeks to target_cylinder j-A target_sector k, and head actuator Y seeks to target_cylinder j-B and target_sector k located 180 degrees away. The seek operations are substantially identical for read or write operations, and establish the ordering of the channels according to the plurality of head actuators seeking to the requested position on the shortest rotational path, and maintaining the physical sector ordering for multiplexing and de-multiplexing during these read or write operations. For a write cycle, the data stream is de-multiplexed into two streams and the first physical sector data stream is written to head X while the second physical sector data stream is written to head Y as shown in FIG. 6A, with the ordering of de-multiplexing following the order of the physical sectors 1 through n. During a Read cycle, the opposite occurs, and the first physical sector data stream is read from head X and the second physical sector data stream is read from head Y, and the resulting output data is multiplexed from the multiple data streams, starting with the first stream from head X and following with the second stream from head Y, exactly as was written. The concept of multiplex and de-multiplex ordering is critical, since the data must be recovered in the same manner as it was written, and the order must be resolvable by the controller 156 of FIG. 2 which is providing this ordering information to the multiplexer/de-multiplexer 152 of FIG. 2.

The alternate case of FIG. 4 is where step 208 determines that head actuator Y is closest to the first ordered physical sector, rather than X, as was earlier described. When head actuator Y is closest to the first physical sector, head actuator Y seeks to target_cylinder j-A target_sector k, and head actuator X seeks to the second physical sector at target_cylinder j-B and target_sector k located 180 degrees away. For a write cycle, the data stream is de-multiplexed into two streams and the first stream is written to head Y while the second stream is written to head X, with the ordering of de-multiplexing following the order of the physical sectors 1 through n. During a Read cycle, the opposite occurs, and the first stream is read from head Y and the second stream is read from head X, and the resulting output data is multiplexed from the data stream, starting with the first stream from head Y and following with the second stream from head X, exactly as was written. In this manner, the ordering of data is preserved through multiplexing and demultiplexing, regardless of which head actuator arrives first at the first ordered physical sector.

Figure 5A:
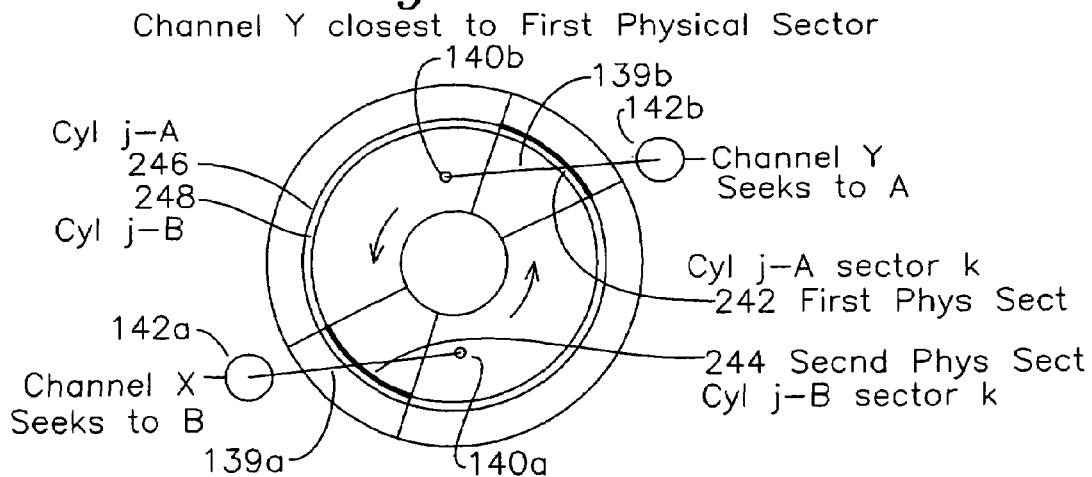
FIGS. 5a and 5b show the seek sequence when the channel Y read/write head is closest to the first physical sector.

FIG. 5a illustrates the case where a read or write to a disk having a plurality of logical sectors, for which one logical sector is shown comprising a first physical sector 242 on cylinder A 246 and a second physical sector 244 on cylinder B 248. Noting the direction of rotation, channel Y read/write head 140b is closest to the first physical sector 242 on cylinder A and channel X read/write head 140a is closest to the second physical sector 244 on cylinder B. First physical sector 242 and second physical sector 244 are rotating towards Y read/write head 140b and X read/write head 140a respectively. According to the present algorithm and the current description of logical sectors, the Y channel read/write head 140b seeks to the first physical sector 246, and the X channel read/write head 140a seeks to the second (and last) physical sector 248.

Figure 5B:
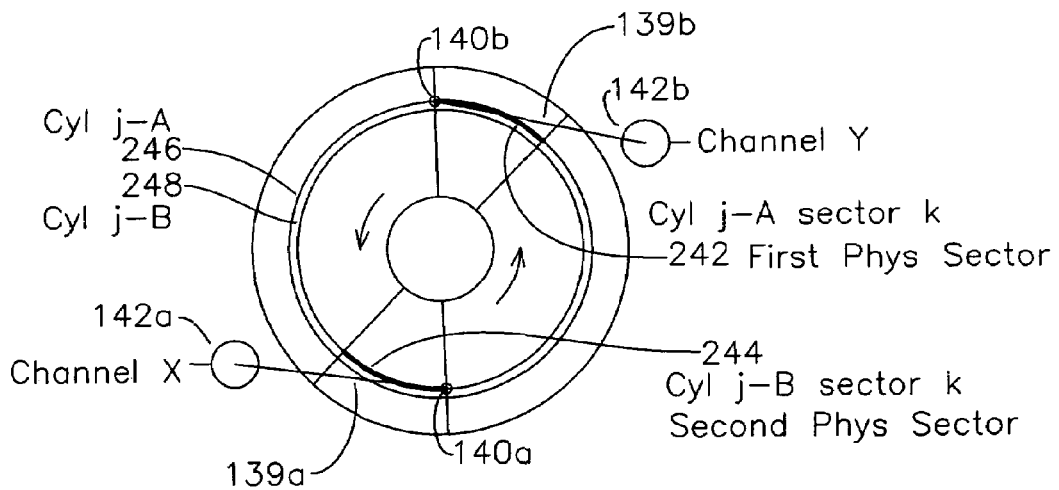

FIG. 5b shows the final result of this seek operation, and now Y channel read/write head 140b is positioned over the start of first physical sector 242, and Y channel read/write head 140a is positioned over the start of second physical sector 244. Data may now be multiplexed for a read, or de-multiplexed for a write, from channel Y followed by channel X, preserving the ordering of the physical sectors from first to last. The granularity of multiplexing and de-multiplexing may be on any level, as will be described later.

Figure 5C:
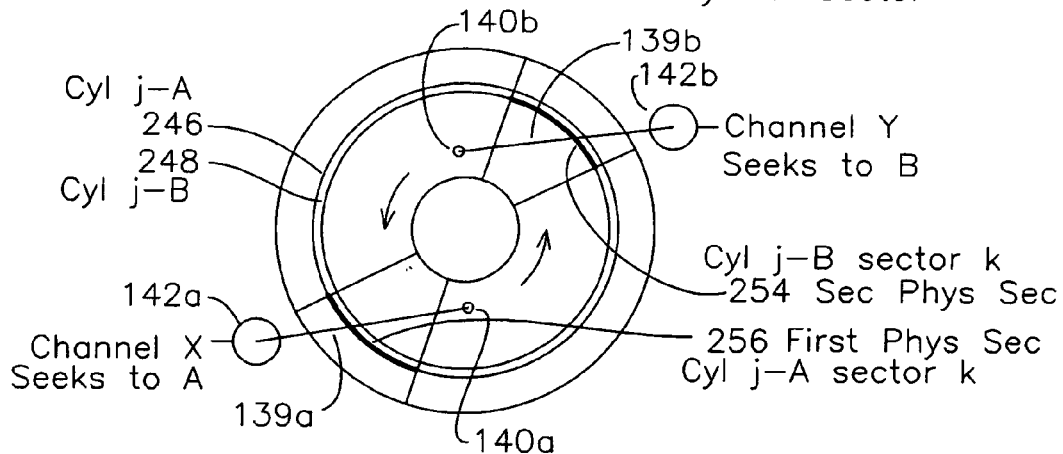
FIGS. 5c and 5d show the seek sequence when the channel X read/write head is closest to the first physical sector.

FIG. 5c shows the opposite case where first physical sector 256 is approaching channel X read/write head 140a and second physical sector 254 is approaching channel Y read/write head 140b. For this case, head actuator X 139a seeks to sector 256 on cylinder A 246 and head actuator Y 139b seeks to sector 254 on cylinder B 248, which is the opposite cylinder seek operation of FIG. 5a.

Figure 5D:
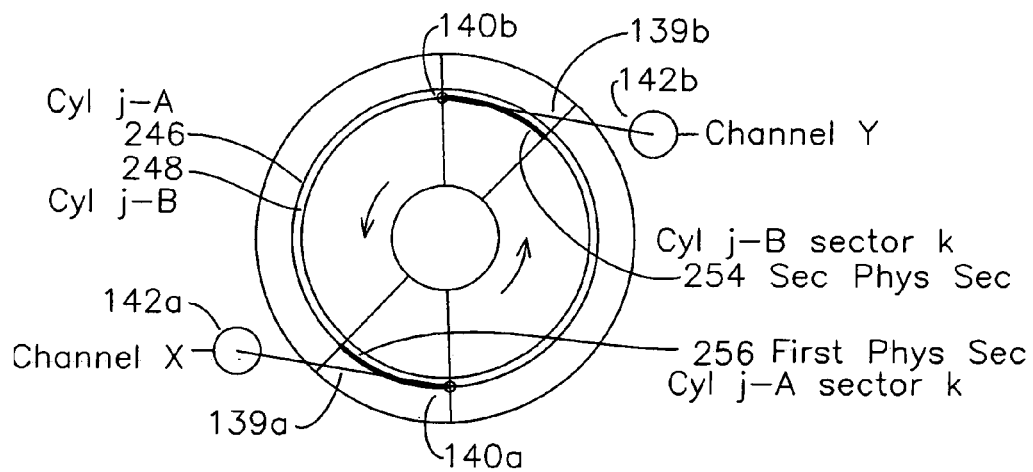

FIG. 5d shows the position of the physical sectors and head actuators after the seek operation is complete. Channel X read/write head 140a is now reading or writing data from first physical sector 256, and channel Y read/write head 140b is now reading or writing data from second physical sector 254. Data may now be multiplexed for a read, or de-multiplexed for a write, from channel X followed by channel Y, the opposite order described earlier in FIGS. 5a and 5b. In this manner, the ordering of physical sectors is preserved.

FIG. 6a illustrates the de-multiplexing of data for a write operation, whereby the data stream to be written is "aa bb cc dd ee ff . . . ", as shown. The data is de-multiplexed n ways (here shown for n=2), and the data written to the first physical sector is "aa cc ee . . . ", while the data written to the second physical sector is "bb dd ff . . . ". The granularity of de-multiplexing may be any level of granularity desired, and may be at the level of individual bits, nibbles, bytes, words, or any level which is suitable for the data storage application. The use of "aa bb cc . . . " is only given to illustrate the ordering of data units aa, bb, cc, etc., and is not intended to suggest a particular size of each data unit.

Figure 6B:
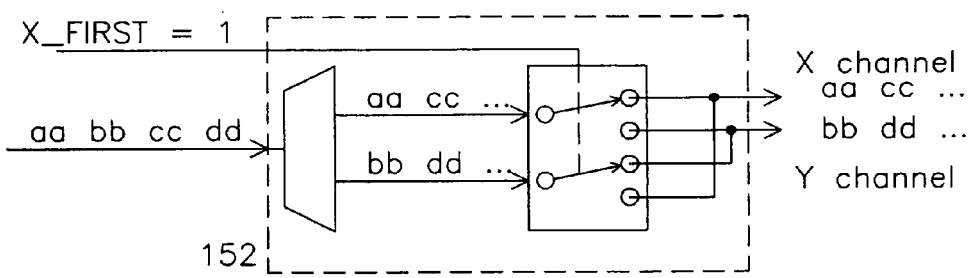
Figure 6C:
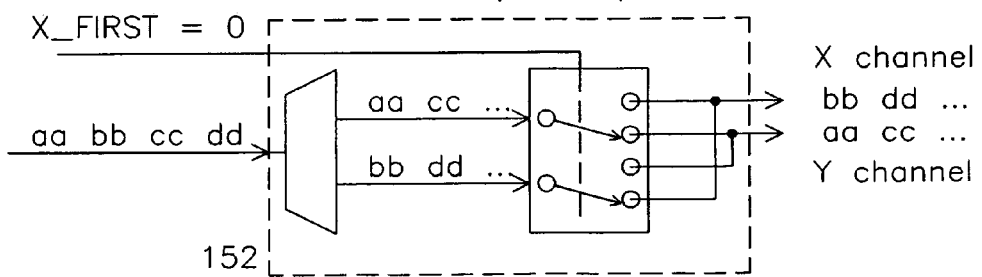

FIG. 6b shows the write de-multiplexer for the case of FIG. 5c. During the seek interval of FIG. 5c, the controller 108 of FIG. 2 computes which head actuator is closest to the first ordered physical sectors, and each head actuator independently seeks to that particular physical sector. The controller 108 also needs to provide the ordering information to the de-multiplexer 152, which is done in the form of signal X_FIRST. For the case of n=2, when X_FIRST=1, it indicates that the X channel carries the first physical sector in the de-multiplex stream, and when X_FIRST=0, it indicates that the Y channel carries the first physical sector in the demultiplex stream, as shown in FIG. 6c.

FIG. 6d shows the analogous multiplexing operation for read data recovered. Whether read on the X or Y channel, the data is taken from first physical sector A cylinder "aa cc ee . . . " as shown, and simultaneously from the second physical sector B cylinder "bb dd ff . . . " as shown. The data is multiplexed into the stream "aa bb cc dd . . . " as shown, by preserving the ordered physical sectors in the multiplexing operation. The preservation of order is shown in FIG. 6e, where the controller provides an ordering indication via signal X_FIRST, which indicates as before whether the first physical sector is found on the X channel or Y channel. The multiplexer selects X channel data to present first based on the assertion of controller signal X_FIRST as in FIG. 6e, or Y channel data to present first if X_FIRST is not asserted as in FIG. 6f.

Having explained a particular configuration where the number of sectors=8, the number of head actuators n=2, error correction placed between the controller and multiplexer, and a particular selection of ordered physical sectors based on a single sided disk, it is obvious to one skilled in the art that many different variants of the invention may be practiced.

With regard to the number of sectors, number of independently controllable head actuators, and the arrangement of ordered physical sectors, it is clear that any number of head actuators and physical sectors n may be realized independently. For example, on a two-sided single disk 136 with the head actuators 139a and 139b having multiple selectable heads 140a and 140b, respectively, where the selectable heads 140a and 140b are each selectable to read either a top or bottom surface, an ordered physical sector may comprise a first sector from a cylinder near to one controllable read/write head 140a, and a sector located 360/n degrees circumferentially about the spindle and located on the opposite side of the disk near to a different read/write head 140b, thereby forming an ordered logical sector where the physical sectors are on the same cylinder, but located on opposing disk surfaces separated by 360/n degrees of arc about the spindle center. In the case of a multi-disk spindle, where multiple disks are rotating, the ordered physical sectors may be arranged in a very large number of configurations. In the preferred mode, the arrangement of head actuators, logical sectors, and physical sectors is as follows:

1) Where the number of independently controllable head actuators is n, the separation between these head actuators is substantially 360/n degrees about the spindle center.

2) Where the number of independently controllable head actuators is n, the physical sectors-on a cylinder should be arranged such that the start of physical sectors enables the simultaneous reading of data from all of the ordered physical sectors uniquely by each of the n head actuators.

3) Where a plurality of disk surfaces are present, either opposing surfaces of a single disk, or multiple disks commonly rotating about a center spindle, the ordered physical sectors may be placed on the same cylinder of different surfaces such that the ordered physical sectors are of identical data length.

With regard to the error correction circuit 154a shown on FIG. 2, it is obvious to one skilled in the art of error codes, that the types of codes used in disk drives are block codes such as Reed-Solomon, or any type of ECC which is suitable for this use. The ECC is a bi-directional operation—extra bits are added during write operations to the disk media, and these bits are removed and used to correct or detect data errors during read operations to the disk media. FIG. 2 shows ECC 154a operating as a single block on data prior to the mux/demux 152. It is clear to one skilled in the art that the ECC could also operate on a per-head actuator basis, whereby instead of a single ECC 154a for data encoding and decoding, the ECC could alternately operate as two functions located between the mux/demux 152 and head r/w amplifier/controller, shown optionally as 154b.

With regard to each independently movable head actuator such as 139a and 139b of FIG. 2 for the case of n=2, each independently movable head actuator may move a plurality of read/write heads 140a, each of which operates over a rotating surface where disk 136 includes a top and bottom rotating surface, and further when disk 136 includes a plurality of commonly rotating disks, and head actuator 139a moves a plurality of read/write heads 140a which includes a plurality of stacked heads, each head coupled to a rotating surface. As is known in the prior art of single actuator disk drives, there may be a plurality of heads operating on the disk media, however only one head at a time is selected and used to read or write a particular track. In the present invention, when a plurality of heads is on a single actuator 139a, only one of the heads is selected and used. As long as there is at least one head selected from each stack of independently seeking heads 140a, 140b, etc, the invention may be practiced in its most efficient manner for the reduction of rotational latency while increasing throughput on read and write operations.

With regard to the movable head actuator, the associated read/write head may be capable of reading or writing an optical surface, such as a CD-ROM or DVD-ROM, or the associated read/write head may be capable of reading or writing a magnetic surface, such as a hard disk drive.

I claim:

1. A disk drive data storage system having:
   a rotating disk having at least one data surface, said rotating disk having a spindle at the center of rotation of said disk;
   a plurality n of independently movable head actuators, said plurality of movable head actuators coupled to at least one read/write head, said head actuators located substantially 360/n degrees circumferentially about said spindle, each said read/write head processing a head data stream concurrently with other said head data streams;
   said rotating disk including at least one logical sector, said logical sector comprising n ordered physical sectors in sequence, said ordered physical sector sequence being a first physical sector through an nth physical sector, each said physical sector located such that all said n head actuators are capable of simultaneously and uniquely seeking to said n ordered physical sectors within a seek time;
   multiplexing means coupled to said n head data streams and producing a single stream of read data from said n head data streams, said stream of read data including, in sequence, head data from said first physical sector through said nth physical sector;
   where n is an integer greater than 1.

2. The disk storage system of claim 1 where said n equals 2, 3, or 4.

3. The disk storage system of claim 1 where each said movable head actuator includes a plurality of selectable said read/write heads, each said read/write head coupled to a different surface of said rotating disk.

4. The disk storage system of claim 1 where said multiplexer includes error correction circuitry for each said head data stream.

5. The disk storage system of claim 1 where said multiplexer includes error correction circuitry for said stream of read data.

6. The disk storage system of claim 1 where said logical sector comprises said physical sectors on adjacent cylinders of said rotating disk.

7. The disk storage system of claim 1 where said ordered physical sectors comprise physical sectors on different surfaces of the same cylinder of said rotating disk.

8. The disk storage system of claim 7 where said different surfaces includes the surfaces of multiple disks having a common said spindle.

9. The disk storage system of claim 1 where said rotating disk includes either a magnetically readable surface or an optically readable surface.

10. The disk storage system of claim 1 where said logical sector comprises said physical sectors on the same cylinder of said rotating disk.

11. A disk data storage system for writing a stream of write data, said disk data storage system having:
 a rotating disk having at least one surface, said rotating disk having an axis at the center of rotation of said disk;
 a plurality n of independently controllable head actuators, each said head actuator having at least one read/write head, said plurality of head actuators located substantially 360/n degrees circumferentially about said axis, each said actuator having at least one said read/write head receiving a head data stream;
 said rotating disk including a least one logical sector, said logical sector comprising n ordered physical sectors in sequence, said ordered physical sector sequence being a first physical sector through an nth physical sector, each said physical sector located such that all said n head actuators have at least one said read/write head, said head actuators capable of simultaneously and uniquely positioning each said associated said read/write head over said n ordered physical sectors within a seek time;
 de-multiplexing means coupled to said stream of write data, said de-multiplexing means producing said n head data streams to each respective actuator head according to said physical sector order;
 where said de-multiplexing means generates said n head data streams by coupling successive segments of said write data stream into said head data stream associated with said first physical sector through said head data stream associated with said nth physical sector;
 where n is an integer greater than 1.

12. The disk storage system of claim 11 where said n equals 2, 3, or 4.

13. The disk storage system of claim 11 where each said controllable head actuator includes a plurality of selectable said read/write heads, each said read/write head coupled to a different surface of said rotating disk.

14. The disk storage system of claim 11 where said de-multiplexer includes error correction circuitry for each said head data stream.

15. The disk storage system of claim 11 where said de-multiplexer includes error correction circuitry for said stream of write data.

16. The disk storage system of claim 11 where said logical sector comprises said physical sectors on adjacent cylinders of said rotating disk.

17. The disk storage system of claim 11 where said ordered physical sectors comprise physical sectors on different surfaces of the same cylinder of said rotating disk.

18. The disk storage system of claim 17 where said different surfaces includes the surfaces of multiple disks having a common said spindle.

19. The disk storage system of claim 11 where said rotating disk includes either a surface capable of being magnetically written or a surface capable of being optically written.

20. The disk storage system of claim 11 where said de-multiplexer includes error coding means for said write data and serializing means for said head data stream.

21. The disk storage system of claim 11 where said logical sector comprises said physical sectors on the same cylinder of said rotating disk.

22. A system for reading data from a rotating disk having a least one surface, said rotating disk having an axis at the center of rotation of said disk;
 a plurality n of independently controllable head actuators, said plurality of head actuators located substantially 360/n degrees circumferentially about said axis, each said head actuator coupled to at least one read/write head generating a stream of head data from said disk surface after a seek time;
 said rotating disk including at least one logical sector, said logical sector comprising n ordered physical sectors, each said ordered physical sector located such that all said n heads are capable of uniquely and simultaneously reading said n ordered physical sectors;
 multiplexing means coupled to said n streams of head data;
 such that upon reading said logical sector, each said read/write head uniquely seeks to and accesses one of said physical sectors, and said multiplexer combines said n streams of head data to produce a single stream of output data;
 whereby each one of said n head actuators seeks to a respective nearest arriving each said physical sector, and said multiplexing means orders said head data to preserve said order of said n physical sectors forming said logical sector;
 where n is an integer greater than 1.

23. The system of claim 11 where said n equals 2, 3, or 4.

24. The system of claim 22 where each said independently controllable head actuators include a plurality of selectable said read/write heads, each said read/write head coupled to a different surface of said rotating disk.

25. The system of claim 22 where said multiplexer includes error correction circuitry for each said head data stream.

26. The system of claim 22 where said multiplexer includes error correction circuitry for said stream of read data.

27. The system of claim 22 where said logical sector comprises said physical sectors on adjacent cylinders of said rotating disk.

28. The system of claim 22 where said ordered physical sectors comprise physical sectors on different surfaces of the same cylinder of said rotating disk.

29. The system of claim 28 where said different surfaces includes the surfaces of multiple disks having a common said axis.

30. The system of claim 22 where said multiplexer includes error correction means for said read data and de-serializing means for said head data streams.

31. The system of claim 11 where said de-multiplexing means includes buffering means.

32. A system for storing write data to a rotating disk having at least one surface, said rotating disk having a axis at the center of rotation of said disk;
- a plurality n of independently controllable head actuators, said plurality of head actuators located substantially 360/n degrees circumferentially about said axis, each said movable head actuator coupled to a read/write head receiving a head data stream;
- said rotating disk including at least one logical sector, said logical sector comprising n ordered physical sectors, each said ordered physical sector located such that all said n head actuators have at least one read/write head capable of simultaneously writing said n ordered physical sectors;
- a de-multiplexer coupled to said write data, said de-multiplexer generating said n head data streams;
- such that each said read/write head uniquely seeks to each one of said physical sectors, and said write data is de-multiplexed into said n head data streams and written to said rotating disk surface;
- whereby each one of said n head actuators seeks to a respective nearest arriving each said physical sector, and said de-multiplexer provides said head data ordered to preserve the order of said n physical sectors forming said logical sector;
- where n is an integer greater than 1.

33. The system of claim 32 where said n equals 2, 3, or 4.

34. The system of claim 32 where each said independently controllable head actuators is coupled to a plurality of selectable said read/write heads, each said read/write head being coupled to a different surface of said rotating disk.

35. The system of claim 32 where said de-multiplexer includes error correction circuitry for each said head data stream.

36. The system of claim 32 where said de-multiplexer includes error correction circuitry for said stream of write data.

37. The system of claim 32 where said logical sector comprises said physical sectors on adjacent cylinders of said rotating disk.

38. The system of claim 32 where said ordered physical sectors comprise physical sectors on different surfaces of the same cylinder of said rotating disk.

39. The system of claim 38 where said different surfaces includes the surfaces of multiple disks having a common said axis.

40. The system of claim 32 where said head data stream is converted from serial data to parallel data.

41. The system of claim 32 where said de-multiplexer includes error coding means for said write data and serializing means for said head data stream.

42. A process for storing and retrieving data on a disk rotating about an axis, said disk having a plurality n of heads for reading or writing said data, said n heads independently capable of seeking to a location on said disk, said data on said disk organized into a plurality of logical sectors, each said logical sectors comprising n ordered physical sectors of storage for simultaneous use by said n heads, said process comprising:
- upon a read or write request, seeking each said head independently to the closest each ordered physical sector to arrive to the nearest said head after a seek time;
- for a read operation, multiplexing data from said n heads according to said order;
- for a write operation, de-multiplexing data to said n heads according to said order;
- where n is an integer greater than 1.

43. The process of claim 42 where said logical sector comprises physical sectors spaced substantially 360/n degrees radially about said axis.

44. The process of claim 42 where said logical sector comprises said n physical sectors spaced circumferentially at substantially the same angular position as said independently controllable head actuators.

45. The process of claim 42 where said rotating disk has a surface which can be either magnetically or optically read by said head.

46. The process of claim 42 where said physical sectors are on different surfaces of said rotating disk.

47. The process of claim 42 where said physical sectors are on the same surface of said rotating disk.

48. The process of claim 42 where said physical sectors are on the same cylinder and different surfaces of said rotating disk.

49. The process of claim 42 where said physical sectors are on different cylinders and the same surface of said rotating disk.

50. The process of claim 42 where said physical sectors are on the different cylinders and different surfaces of said rotating disk.

* * * * *